(12) United States Patent
Palma

(10) Patent No.: US 8,138,697 B2
(45) Date of Patent: Mar. 20, 2012

(54) SENSORLESS SPEED DETECTION DURING ZERO VECTOR

(75) Inventor: Marco Palma, Leini' (IT)

(73) Assignee: International Rectifier Corporation, El Segundo, CA (US)

( * ) Notice: Subject to any disclaimer, the term of this patent is extended or adjusted under 35 U.S.C. 154(b) by 921 days.

(21) Appl. No.: 12/105,818

(22) Filed: Apr. 18, 2008

(65) Prior Publication Data

US 2008/0265817 A1    Oct. 30, 2008

Related U.S. Application Data

(60) Provisional application No. 60/914,412, filed on Apr. 27, 2007.

(51) Int. Cl.
*H02P 21/00* (2006.01)
(52) U.S. Cl. ............. 318/400.02; 318/400.32; 318/696; 324/650
(58) Field of Classification Search ............. 318/400.02, 318/400.32, 696; 324/650
See application file for complete search history.

(56) References Cited

U.S. PATENT DOCUMENTS

| | | | |
|---|---|---|---|
| 6,735,537 B2 * | 5/2004 | Liu et al. .................. | 702/64 |
| 7,227,331 B2 * | 6/2007 | Galli et al. ................. | 318/808 |
| 7,414,425 B2 * | 8/2008 | O'Gorman et al. ....... | 324/765.01 |
| 2005/0269982 A1 * | 12/2005 | Coles et al. .................. | 318/254 |
| 2007/0001635 A1 | 1/2007 | Ho | |

* cited by examiner

*Primary Examiner* — Walter Benson
*Assistant Examiner* — Erick Glass
(74) *Attorney, Agent, or Firm* — Farjami & Farjami LLP

(57) ABSTRACT

A speed estimation method for determining the speed of a sensorless permanent magnet brushless motor having one or more phases driven by one or more stages of an inverter, each stage including high- and low-switches connected in series across a DC Bus and having a respective common switched node, the respective switched node being coupled to a respective motor phase terminal. The method includes the steps of applying an alternating sequence of Zero Vectors to the inverter, the sequence alternating between a first Zero Vector whereby motor current does not flow in the DC Bus and a second Zero Vector wherein the high and low side switches of the inverter are alternately turned on with active vector components being injected by the inverter for each inverter stage thereby to allow motor current to flow in the DC Bus, whereby the terminals of the motor during the first and second Zero Vectors are shorted to brake the motor without substantially raising the voltage of the DC Bus during the braking time; and the speed of the motor can be determined by measuring the current in a sensor of the DC bus during the time when the second Zero Vector is applied without using a sensor in the motor.

15 Claims, 4 Drawing Sheets

Output: reconstructed sensorless speed during Zero Vector Braking

SENSORLESS SPEED DETECTION DURING ZERO VECTOR

CROSS-REFERENCE TO RELATED APPLICATION

This application is based on and claims priority to U.S. Provisional Patent Application Ser. No. 60/914,412, filed on Apr. 27, 2007 and entitled SENSORLESS SPEED DETECTION DURING ZERO VECTOR, the entire contents of which is incorporated by reference herein.

BACKGROUND OF THE INVENTION

The present invention relates to speed detection in permanent magnet (PM) brushless motors, and more specifically to measuring the DC bus current when the motor terminals are shorted or the "Zero Vector" is applied to brake the motor.

SUMMARY OF THE INVENTION

It is an object of the present invention to provide a method of estimating speed of a permanent magnet (PM) brushless motors without using internal motor sensors.

Provided is a speed estimation method for determining the speed of a sensorless permanent magnet brushless motor having one or more phases driven by one or more stages of an inverter, each stage including high- and low-switches connected in series across a DC Bus and each having a respective common switched node, the respective switched node being coupled to a respective motor phase terminal. The method includes the steps of applying an alternating sequence of Zero Vectors to the inverter, the sequence alternating between a first Zero Vector whereby motor current does not flow in the DC Bus and a second Zero Vector wherein the high and low side switches of the inverter are alternately turned on with active vector components being injected by the inverter for each inverter stage thereby to allow motor current to flow in the DC Bus, whereby the terminals of the motor during the first and second Zero Vectors are shorted to brake the motor without substantially raising the voltage of the DC Bus during the braking time; and the speed of the motor can be determined by measuring the current in a sensor of the DC bus during the time when the second Zero Vector is applied without using a sensor in the motor.

Other features and advantages of the present invention will become apparent from the following description of the invention that refers to the accompanying drawings.

DETAILED DESCRIPTION OF EMBODIMENTS OF THE INVENTION

Figure 1:
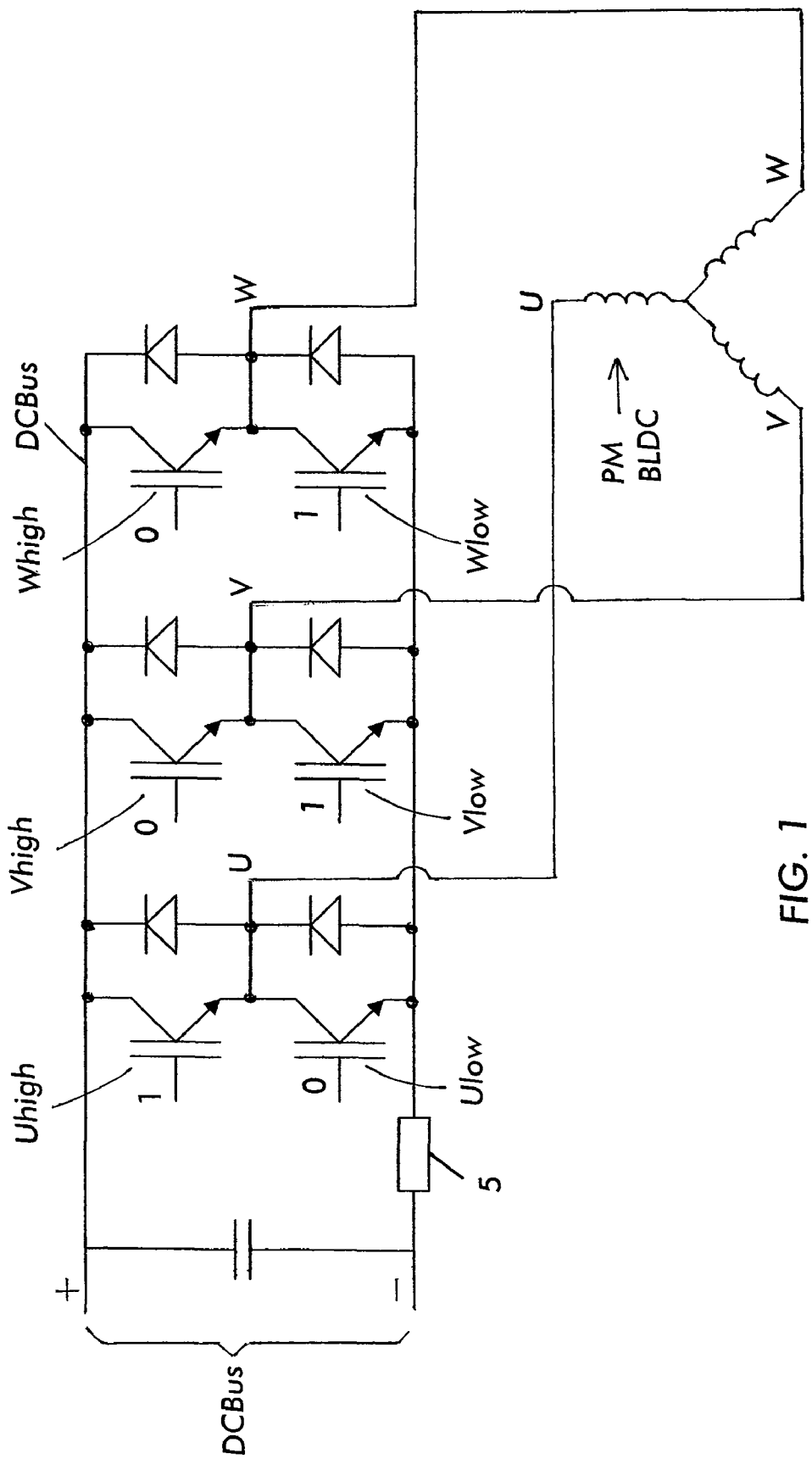
FIG. 1 is a diagram of an inverter for driving a PM brushless motor based on sensorless field-oriented control (FOC) and includes a single shunt on a DC Bus.

The present invention is based on sensorless field-oriented control (FOC) single shunt architecture, for example, using the IRMCFx and IRMCKx ICs from International Rectifier Corporation, and assumes that a PM brushless motor driven by an inverter, e.g., as illustrated in FIG. 1, having one or more stages, including high- and low-side switches connected at a switched node and to a DC Bus, each switched node being coupled to a respective terminal of the motor phase u, v, and w, can be braked by shorting its terminals by applying the "Zero Vector." The Zero Vector is usually, but not exclusively, used in a field weakening region operation.

A number of different Zero Vector configurations are discussed below. In a first Zero Vector configuration, identified in table 1 as ZV1, the motor is shorted by turning on all low-side switches $U_{low}$, $V_{low}$, and $W_{low}$. In this configuration, called "Full low-side Zero Vector", motor currents do not pass through the DC Bus shunt and, therefore, the DC Bus voltage does not rise. In a second Zero Vector configuration, identified in table 1 as ZV2, the motor is shorted by turning on all high-side switches $U_{high}$, $V_{high}$, and $W_{high}$. In this configuration, called "Full high side Zero Vector", the motor currents also do not pass through the DC Bus shunt and, therefore, the DC Bus voltage does not rise. A shunt 5 is used to measure the DC Bus current during normal motor operation (not during Zero Vector).

In a third Zero Vector configuration, identified in table 1 as ZV3, the motor is shorted by alternating the turn on of the low and high side switches. In this configuration, called "Alternating Zero Vector" the motor currents also do not pass through the DC Bus shunt, but the DC Bus voltage may rise during the dead times between the high and low side alternations.

A fourth Zero Vector configuration, identified in table 1 as ZV4, can also be provided in which the motor is shorted with alternating low and high side switches and a small component of active vectors is injected. In this configuration, called "Artificial Zero Vector" the motor currents pass through the DC Bus shunt for a small amount of time and the current can be measured. Hence, flux, speed, and angle can be reconstructed. However, the DC Bus voltage may rise during the injection of active vectors.

Table 1 shows the status of voltage at each phase terminal of the motor for every pulse width modulation (PWM) cycle.

TABLE 1

| | u | v | w |
|---|---|---|---|
| ZV1 | LOW | LOW | LOW |
| ZV2 | HIGH | HIGH | HIGH |
| ZV3 | LOW/HIGH with Duty n % | LOW/HIGH with Duty n % | LOW/HIGH with Duty n % |
| ZV4 | LOW/HIGH with Duty n1% | LOW/HIGH with Duty n2% | LOW/HIGH with Duty n3% | n1, n2 and n3 may be different

The present invention provides a method that allows estimating the speed of a sensorless PM brushless motor while braking the motor by the application of Zero Vector while keeping the DC Bus voltage from substantially rising during the braking time.

Figure 2:
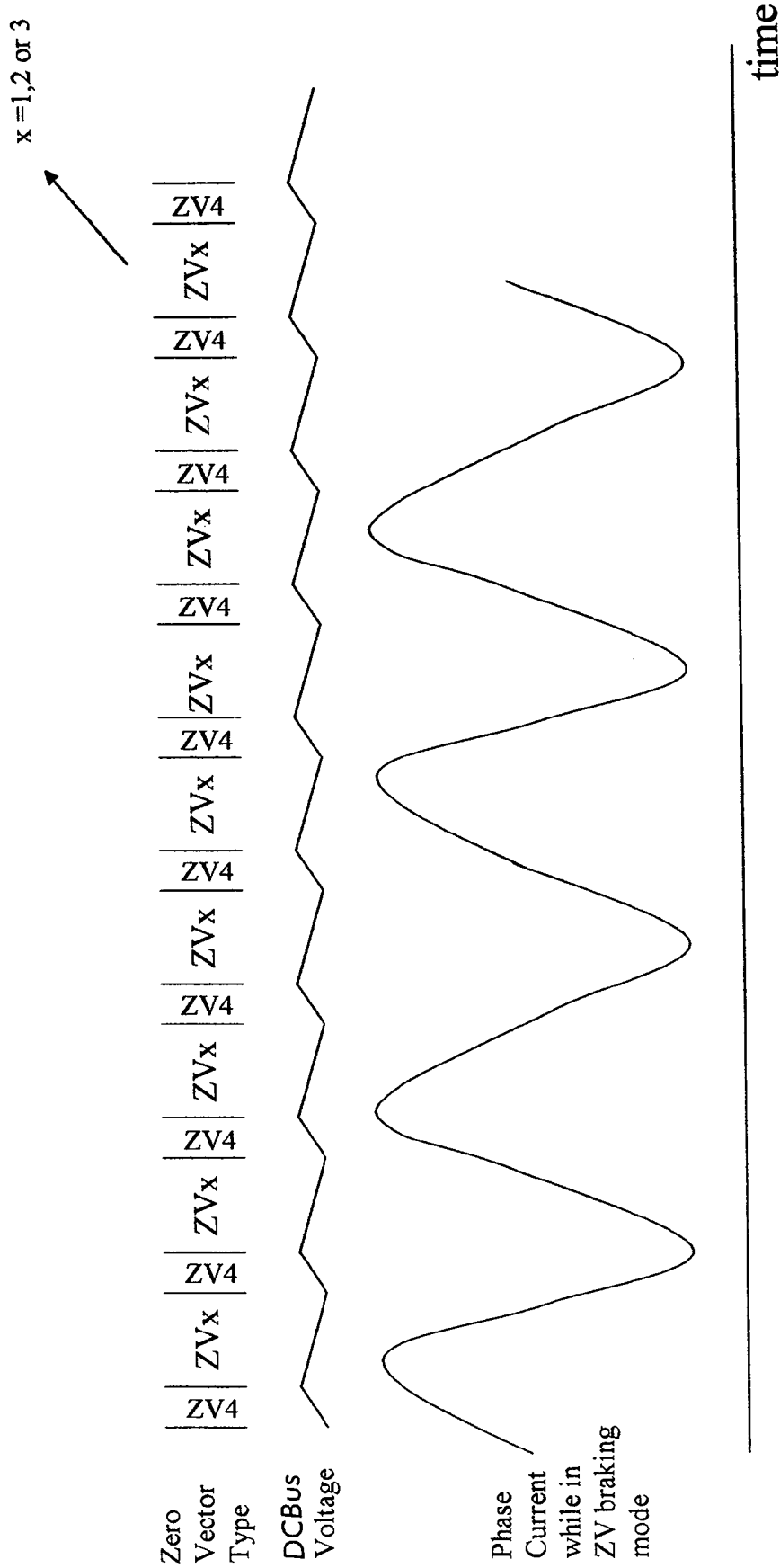
FIG. 2 is a diagram showing the use of a sequence of Zero Vectors according to the present invention that allows measurement of a current in the motor phase connected to the inverter of FIG. 1 by measuring the DC bus current while preventing a voltage on the DC Bus from substantially rising.

The method of the present invention allows making a determination of the speed of a sensorless PM brushless motor without substantially raising the DC Bus voltage while the motor is braked in Zero Vector. FIG. 2 illustrates an embodiment of the present invention in which a sequence of Zero Vector configurations is used to prevent the DC Bus voltage from substantially rising while the phase current is being measured. The sequence alternates from the ZV4 Zero Vector to any one of ZV1, ZV2, and ZV3 Zero Vectors and then back to ZV4 Zero Vector. In the ZV4 time, the current is measured and the speed is reconstructed. During the other Zero Vectors ZV1, ZV2 or ZV3, the current is not measured as there is no motor current through the DC bus sensor.

The alternation from ZV4 to ZVx and back to ZV4 is performed on the fly by a controller, so that the motor is always braked. The duration of ZVx Zero Vector is in the range of 500 ms to allow the DC Bus voltage to fall to a nominal level. The duration of the ZV4 Zero Vector is in the range of 300 ms to allow proper speed reconstruction while preventing a substantial rise in the DC Bus voltage. During the ZV4 Zero Vector, a small amount of active vector is provided to the inverter to ensure motor current will pass through the shunt 5, so that the current and hence speed can be determined. This can be done by appropriate PWM of the gate drives for each of the inverter switches during the application of the ZV4 Zero Vector.

Figure 3:
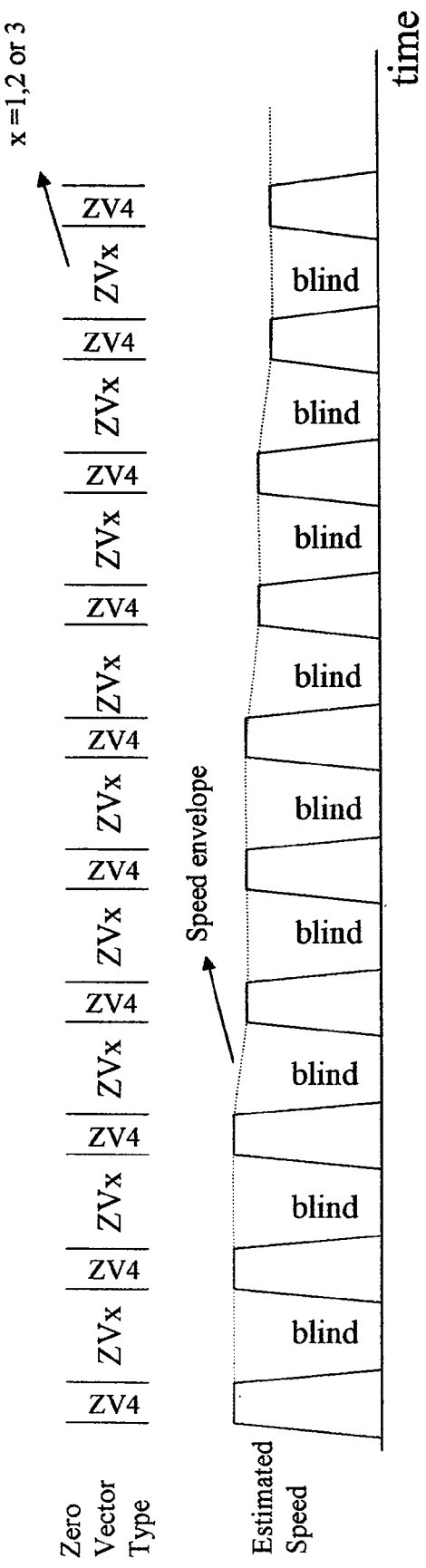
FIG. 3 is a diagram showing the current reconstruction scheme allowing determining the value of currents in the three phases of the motor, achieved during performance of the ZV4 configuration.
Figure 4:
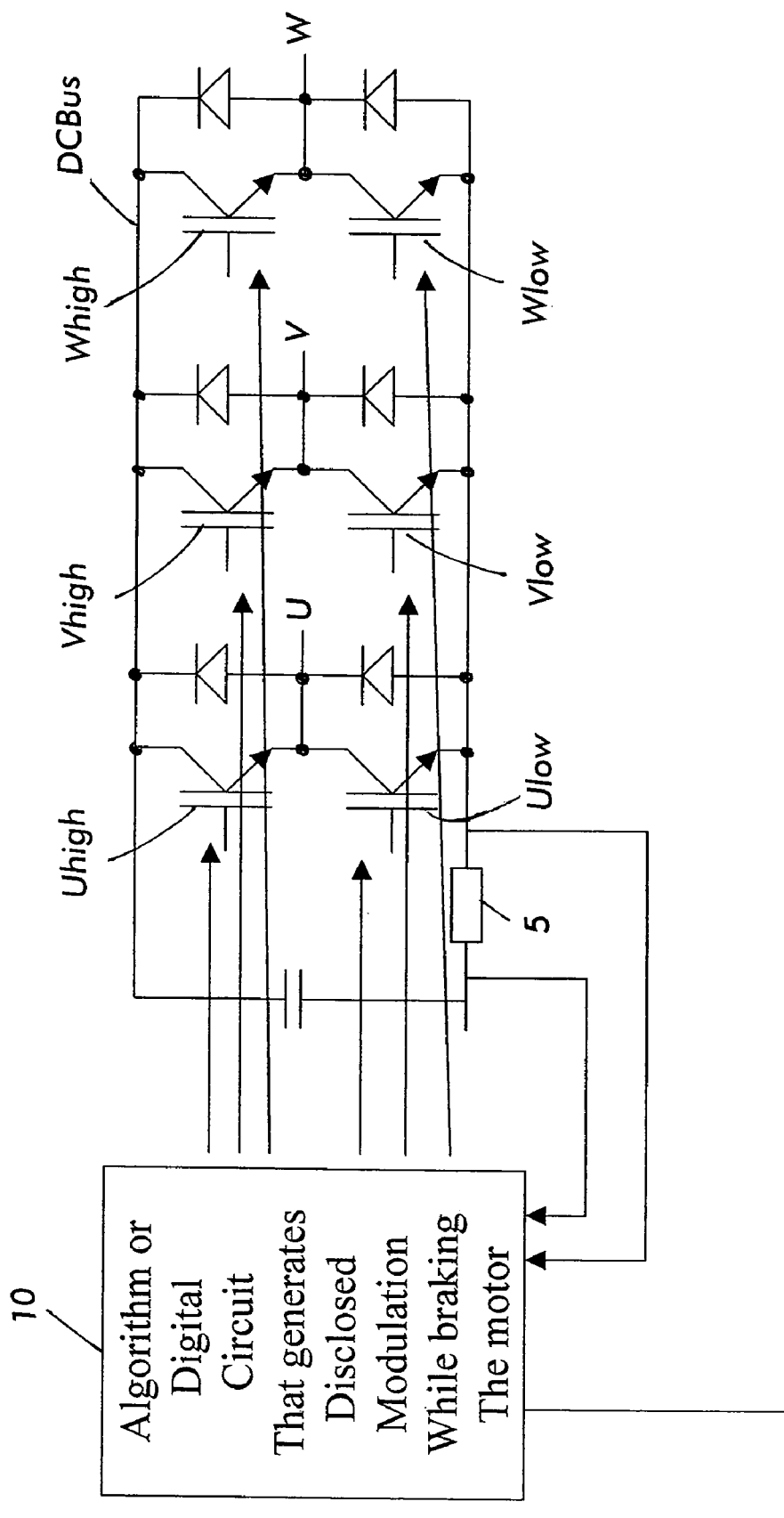
FIG. 4 is a diagram of the inverter of FIG. 1 driven by a gate driver to achieve the goals of the present invention.

As illustrated in FIG. 3, the current reconstruction scheme used allows determining the value of currents in the three phases of the motor during the ZV4 Zero Vector. This is achieved by a gate driver 10 for driving the motor stages illustrated in FIG. 4. The gate driver 10 is connected to gates of each high- and low-side switch $U_{low\ and\ high}$, $V_{low\ and\ high}$, and $W_{low\ and\ high}$ and across the current sensing shunt 5. The gate driver 10 uses an algorithm or a digital circuit to generate the above-described modulation while braking the motor and receiving DC Bus measurements from the shunt 5.

A catch spin methodology allows using the current values for detection of Flux and thus the motor speed where the motor is naturally coasting, e.g., a fan motor of an air conditioner where the fan is being turned by wind. The scheme that may be used for current reconstruction and the catch spin methodology are described in, for example, U.S. Patent Application Publication No. 2007/0001635. The gate driver 10 further outputs the reconstructed sensorless speed during the Zero Vector braking.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A speed estimation method for determining the speed of a sensorless permanent magnet brushless motor having one or more phases driven by one or more stages of an inverter, each stage including high- and low-switches connected in series across a DC Bus and having a respective common switched node, the respective switched node being coupled to a respective motor phase terminal, the method comprising the steps of:

applying an alternating sequence of zero vectors to the inverter, the sequence alternating between a first Zero Vector whereby motor current does not flow in the DC Bus and a second Zero Vector wherein the high and low side switches of the inverter are alternately turned on with active vector components being injected by the inverter for each inverter stage, thereby to allow motor current from each phase to flow in the DC Bus, whereby the terminals of the motor during the first and second Zero Vectors are shorted to brake the motor without substantially raising the voltage of the DC Bus during the braking time;

and further comprising determining the speed of the motor by measuring each phase current in a sensor of the DC bus each time the second Zero Vector is applied without using a sensor in the motor.

2. The method of claim 1, wherein the first Zero Vector comprises any one of a first type Zero Vector where all low side switches are on, a second type Zero Vector where all high side switches are on, or a third type Zero Vector where there is alternation between the high side and low side switches being on, and wherein the second Zero Vector comprises a fourth type Zero Vector, the fourth type Zero Vector comprising the third type Zero Vector with said active vector components being injected by the inverter for each inverter stage.

3. The method of claim 1, wherein sensorless field-oriented control (FOC) single shunt architecture is used to control the motor.

4. The method of claim 1, wherein the first and second Zero Vectors are used in a field weakening region operation.

5. The method of claim 1, wherein the first Zero Vector is selected from one of the first, second, and third type Zero Vectors or any combination of them.

6. The method of claim 5, wherein for the first, second, and third type Zero Vectors motor currents do not pass through the DC Bus sensor and for the second Zero Vector, the motor currents pass through the DC bus sensor for an amount of time whereby the motor current can be measured.

7. The method of claim 6, wherein any of flux, speed and phase angle of the motor can be reconstructed.

8. The method of claim 7, wherein the speed is reconstructed using the current measurement taken during the application of the second Zero Vector.

9. The method of claim 8, wherein a change from the second Zero Vector to the first Zero Vector is performed on the fly by a controller, so that the motor is always braked.

10. The method of claim 9, wherein a duration of the first Zero Vector is in a first range to allow the DC Bus voltage to fall to a nominal level and a duration of the second Zero Vector is in a second range to allow proper speed reconstruction while preventing a substantial rise in the DC Bus voltage.

11. The method of claim 10, wherein the first range is about 500 ms and the second range is about 300 ms.

12. The method of claim 7, wherein the DC Bus voltage may rise insubstantially during the injection of the active vector components.

13. The method of claim 11, wherein during application of the second Zero Vector, the current reconstruction scheme used allows determining the value of the three motor phase currents.

14. The method of claim 13, further comprising using a catch spin methodology wherein when the motor is naturally coasting, the DC bus sensor current is measured to enable determination of the motor flux and thus coasting motor speed.

15. The method of claim 1, wherein the active vector components injected during the second Zero Vector each have a duty cycle, and the duty cycle may be different for each motor phase.

* * * * *